United States Patent
Croak et al.

(10) Patent No.: US 8,799,976 B1
(45) Date of Patent: Aug. 5, 2014

(54) METHOD AND APPARATUS FOR PROVIDING A WEB SESSION WITH A COMMERCIAL ADVERTISER

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 2117 days.

(21) Appl. No.: 11/240,102

(22) Filed: Sep. 30, 2005

(51) Int. Cl.
*H04N 5/445* (2011.01)
*H04N 7/173* (2011.01)

(52) U.S. Cl.
CPC .............. *H04N 7/173* (2013.01); *H04N 5/445* (2013.01)
USPC .................. 725/112; 725/42; 725/87; 725/98

(58) Field of Classification Search
USPC ............ 705/14; 709/217; 725/87, 98, 112, 42
See application file for complete search history.

(56) References Cited

U.S. PATENT DOCUMENTS

| | | | | |
|---|---|---|---|---|
| 6,154,771 A * | 11/2000 | Rangan et al. | ............... | 709/217 |
| 6,411,992 B1 * | 6/2002 | Srinivasan et al. | ............ | 709/218 |
| 6,973,669 B2 * | 12/2005 | Daniels | ........................ | 725/112 |
| 7,337,133 B1 * | 2/2008 | Bezos et al. | .................... | 705/27 |
| 7,987,491 B2 * | 7/2011 | Reisman | ....................... | 725/112 |
| 2002/0032603 A1 * | 3/2002 | Yeiser | ............................. | 705/14 |
| 2002/0156695 A1 * | 10/2002 | Edwards | ......................... | 705/26 |
| 2004/0015994 A1 * | 1/2004 | Choi et al. | ....................... | 725/87 |
| 2004/0186777 A1 * | 9/2004 | Margiloff et al. | ............... | 705/14 |
| 2005/0149981 A1 * | 7/2005 | Augenbraun et al. | ......... | 725/112 |
| 2006/0026067 A1 * | 2/2006 | Nicholas et al. | ................ | 705/14 |

* cited by examiner

*Primary Examiner* — Kieu Oanh T Bui (57) ABSTRACT

A method and apparatus for enabling service providers to offer businesses to advertise using commercials over streaming video contents to interact with interested consumers on a real time basis are disclosed. Specifically, users who request a video session from the network may be exposed to commercial content while viewing the video content via a television monitor. The present method enables advertisers to display hyperlinks of their web sites to allow users to click on these hyperlinks using a pointer device to activate a web session. The web session would allow users to order products and services or obtain more information from the advertiser.

9 Claims, 5 Drawing Sheets

METHOD AND APPARATUS FOR PROVIDING A WEB SESSION WITH A COMMERCIAL ADVERTISER

The present invention relates generally to communication networks and, more particularly, to a method and apparatus for providing a web session with a commercial advertiser on a video display device in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data providing more convenience for end customers and creating new service opportunities. Due to the multi-service nature of these new services, networks need to support multiple simultaneous application sessions to a single subscriber. Very often, streaming video contents sent to a subscriber contain commercials of interest to the subscriber. There should be an integrated way for the subscriber to use a web browser to obtain additional information from the advertiser.

Therefore, a need exists for a method and apparatus for providing a web session with a commercial advertiser on a video display device in a packet network, e.g., a SoIP network.

SUMMARY OF THE INVENTION

In one embodiment, the present invention enables service providers to offer businesses to advertise using commercials over streaming video contents to interact with interested consumers on a real time basis. Specifically, users who request a video session from the network may be exposed to commercial content while viewing the video content via a television monitor. This invention enables advertisers to display hyperlinks of their web sites to allow users to click on these hyperlinks using a pointer device to activate a web session. The web session would allow users to order products and services or obtain more information from the advertiser. This interactive web session can take place in an independent display frame from the ongoing video stream. Alternatively, the interactive web session can be combined with a new video session to enable the advertiser to provide additional content to the users depending on their interest in receiving it. The original streaming video can be placed on hold while the advertiser is engaged in the interactive web session or it can be placed in the background in a separate display frame on the television monitor. A hyperlink is an icon, a graphic image, or a text string within a web page that, when activated, automatically links a user to another web page addressed by a Universal Resource Locator (URL) associated with said icon, graphic image, or text string. A URL is the standard way to express the location of a resource on the Internet and provides a unique address which identifies a resource on the Internet for routing purposes.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
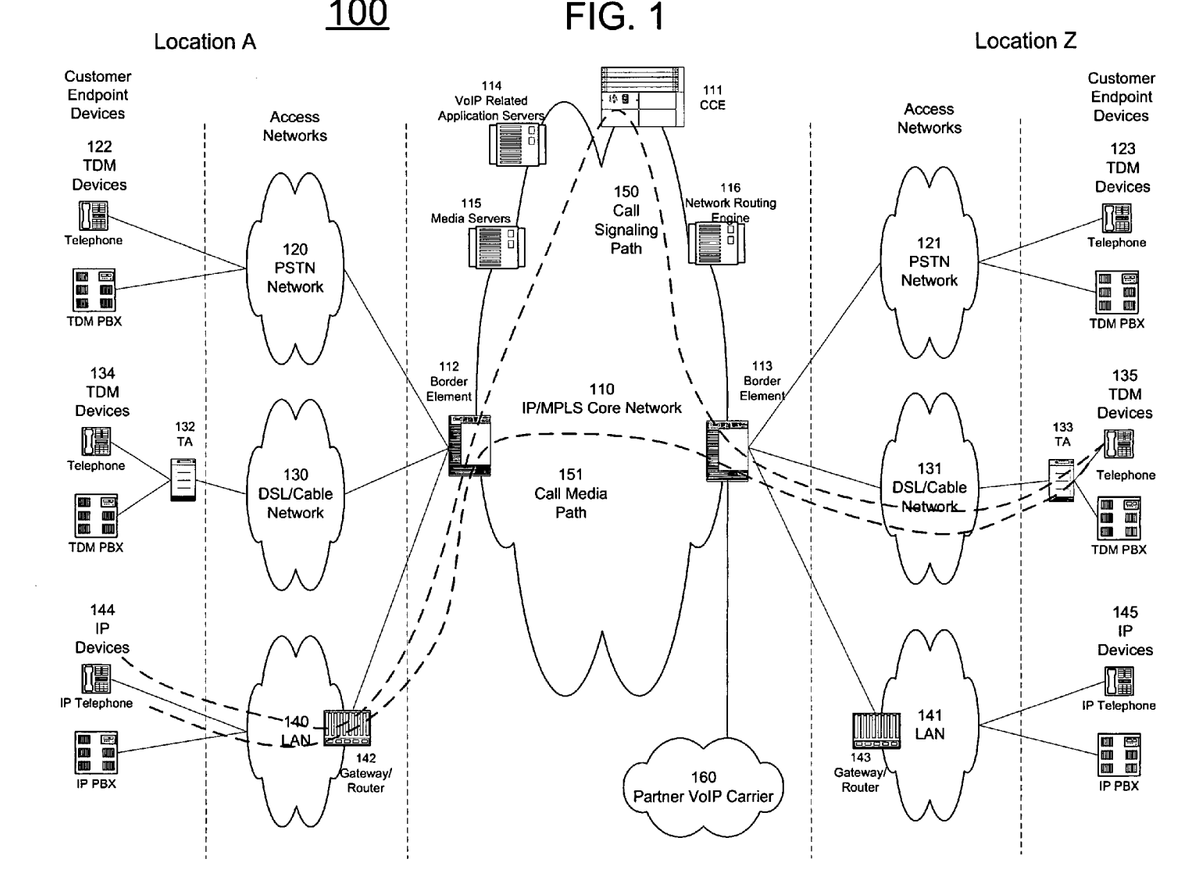
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
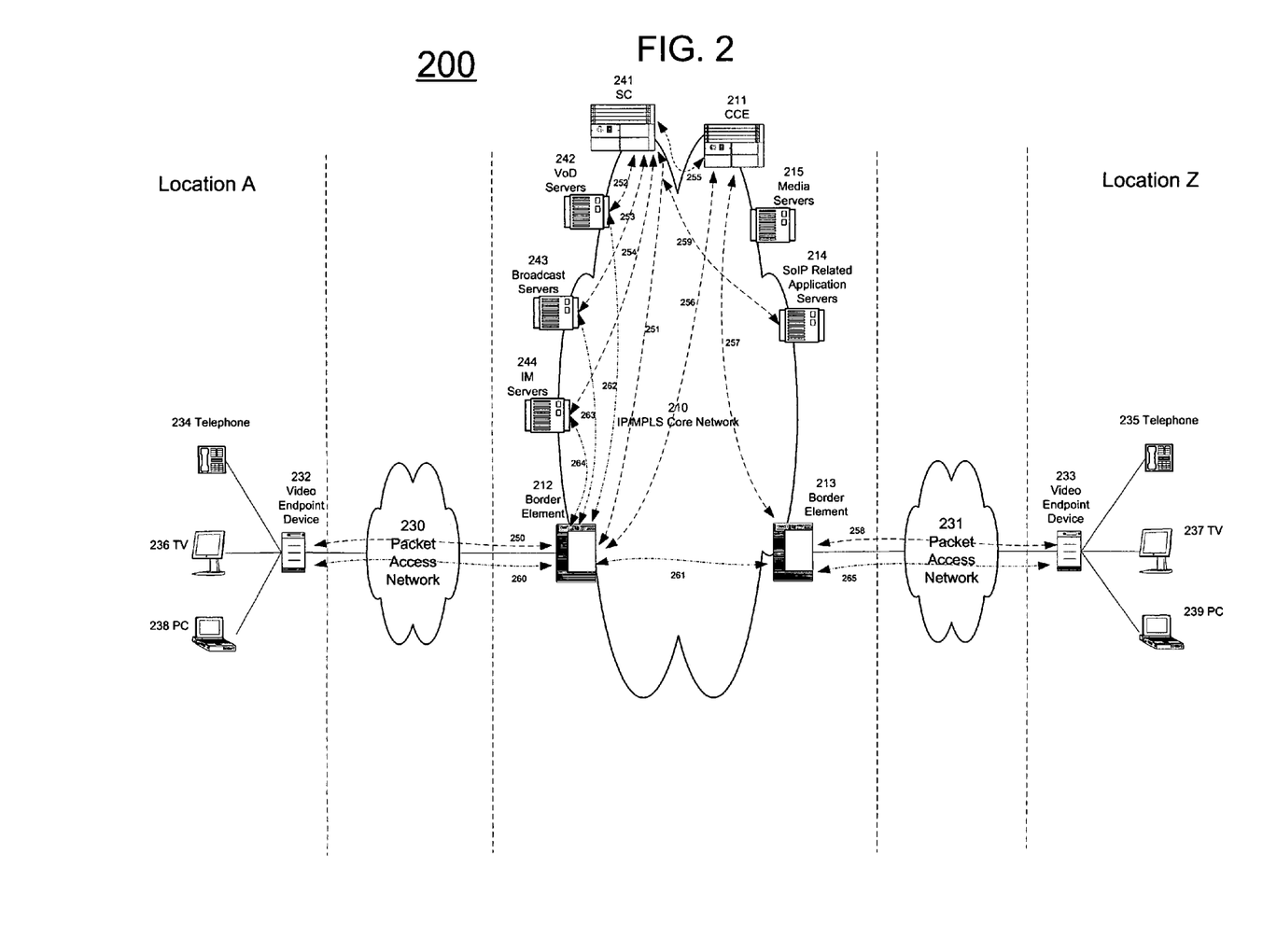
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data providing more convenience for end customers and creating new service opportunities. Due to the multi-service nature of these new services, networks need to support multiple simultaneous application sessions to a single subscriber. Very often, streaming video contents sent to a subscriber contain commercials of interest to the subscriber. There should be an integrated way for the subscriber to use a web browser to obtain additional information from the advertiser.

To address this need, the present invention enables service providers to offer businesses to advertise using commercials over streaming video contents to interact with interested consumers on a real time basis. Specifically, users who request a video session from the network may be exposed to commercial content while viewing the video content via a television monitor. This invention enables advertisers to display hyperlinks of their web sites to allow users to click on these hyperlinks using a pointer device to activate a web session. The web session would allow users to order products and services or obtain more information from the advertiser. This interactive web session can take place in a independent display frame from the ongoing video stream. Alternatively, the interactive web session can be combined with a new video session to enable the advertiser to provide additional content to the users depending on their interest in receiving it. The original streaming video can be placed on hold while the advertiser is engaged in the interactive web session or it can be placed in the background in a separate display frame on the television monitor.

Figure 3:
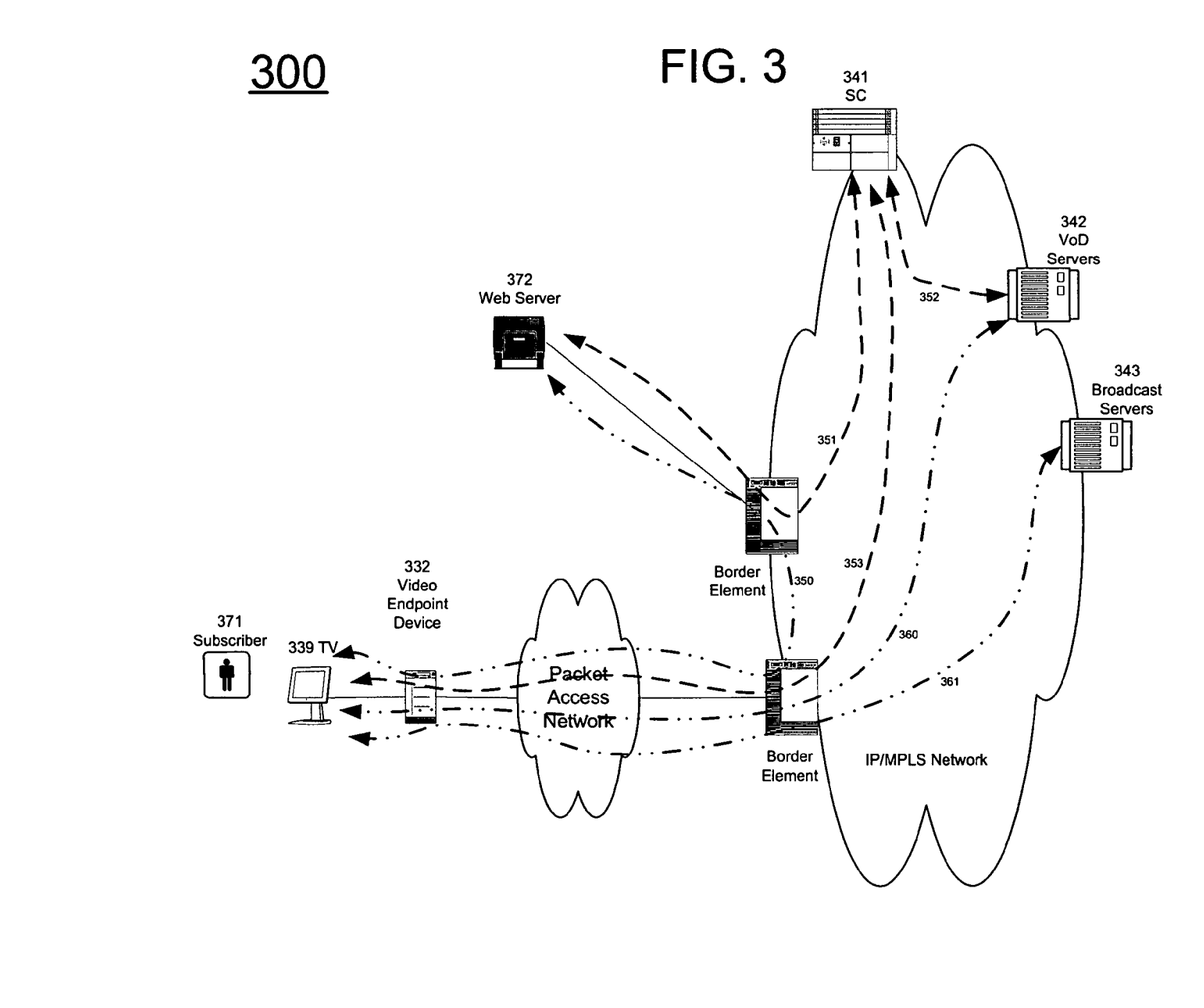
FIG. 3 illustrates an example of providing a web session with a commercial advertiser on a video display device in a packet network, e.g., a SoIP network, of the present invention.

FIG. 3 illustrates an example 300 of providing a web session with a commercial advertiser on a video display device in a packet network, e.g., a SoIP network, of the present invention. In FIG. 3, subscriber 371 is currently engaged in a video session watching streaming video contents send by broadcast server 343 using video flow 361. The streaming video contents are received by video endpoint 332 and displayed on TV 339 in an independent display frame. While watching the broadcast contents, subscriber 371 comes across with a commercial of interest. The commercial shown on screen contains a hyperlink that can be activated by clicking it using a pointer device. Subscriber 371 activates the advertised hyperlink and establishes a web session with web server 372 via signaling flow 353 and 351 via SC 341. The web session request is sent to SC 341 using signaling flow 353. Then, SC 341 forwards the web session request to web server 372 using signaling flow 351. Once the web session is established, communications between video endpoint 332 and web server 372 will take place over data flow 350. The web session is displayed in an independent display frame on TV 339 to be viewed by subscriber 371. The web session provides information related to the products or services being advertised by an advertiser associated with the previous commercial watched by subscriber 371. The advertiser's website can also offer subscriber 371 to receive additional video contents of interest to subscriber 371. If subscriber 371 chooses to receive additional video contents, web server 372 will send a video session setup message to SC 341 using signaling flow 351 to request additional contents to be sent to subscriber 371. SC 341 forwards the video session setup message to VoD server 342 using signaling flow 352. Once the video session is established, VoD server 342 then sends the requested streaming video contents to video endpoint 332 using signaling flow 360 to be displayed in an independent display frame on TV 339 to be viewed by subscriber 371.

Note that while subscriber 371 is engaged in the web session, subscriber 371 can manipulate the existing broadcast video session by placing the video session on hold or continuing the video session as is in a display frame in the background on display 339.

Figure 4:
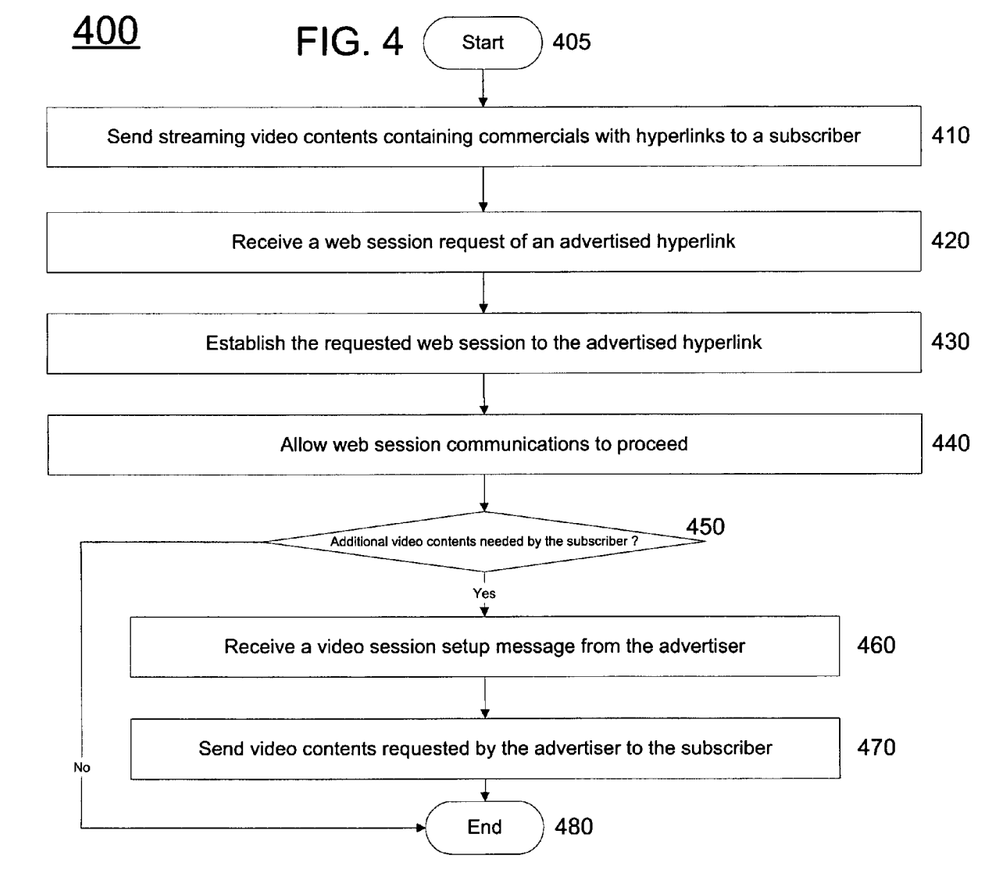
FIG. 4 illustrates a flowchart of a method for providing a web session with a commercial advertiser on a video display device in a packet network, e.g., a SoIP network, of the present invention.

FIG. 4 illustrates a flowchart of a method 400 for providing a web session with a commercial advertiser on a video display device in a packet network, e.g., a SoIP network, of the present invention. Method 400 starts in step 405 and proceeds to step 410.

In step 410, the method is sending streaming video content containing commercials with embedded hyperlinks to a subscriber. The streaming video content is sent by a VoD Server or a Broadcast Server.

In step 420, the method receives a web session setup message from the subscriber which has been activated by the subscriber by clicking on an advertised hyperlink in a commercial within the streaming video contents shown on the video display device to the subscriber. The web session setup message is received by a SC.

In step 430, the method completes the web session to the advertised hyperlink. The SC forwards the web session setup message to a Web Server to complete the web session setup procedures.

In step 440, the method allows the web session to proceed between a web server and the subscriber. Note that during the web session between the subscriber and the web server, the subscriber can manipulate the existing video session by placing the video session on hold or continuing the video session as is in a display frame in the background.

In step 450, the method checks if additional video contents are needed by the subscriber. For instance, the web server can suggest providing additional video contents to the subscriber and if the subscriber accepts such an offer, the web server can proceed to request additional video contents to be sent. If additional video contents are needed by the subscriber, the method proceeds to step 460; otherwise, the method proceeds to step 480.

In step 460, the method receives a video session setup signaling message originated by the advertiser to request additional video contents to be sent to the subscriber. The video session setup signaling message is received by the SC.

In step 470, the method establishes a new video session and sends the additional video contents requested by the advertiser to the subscriber. The SC forwards the video session setup signaling message to the VoD Server to setup a new video session between the VoD Server and the subscriber. The method ends in step 480.

Figure 5:
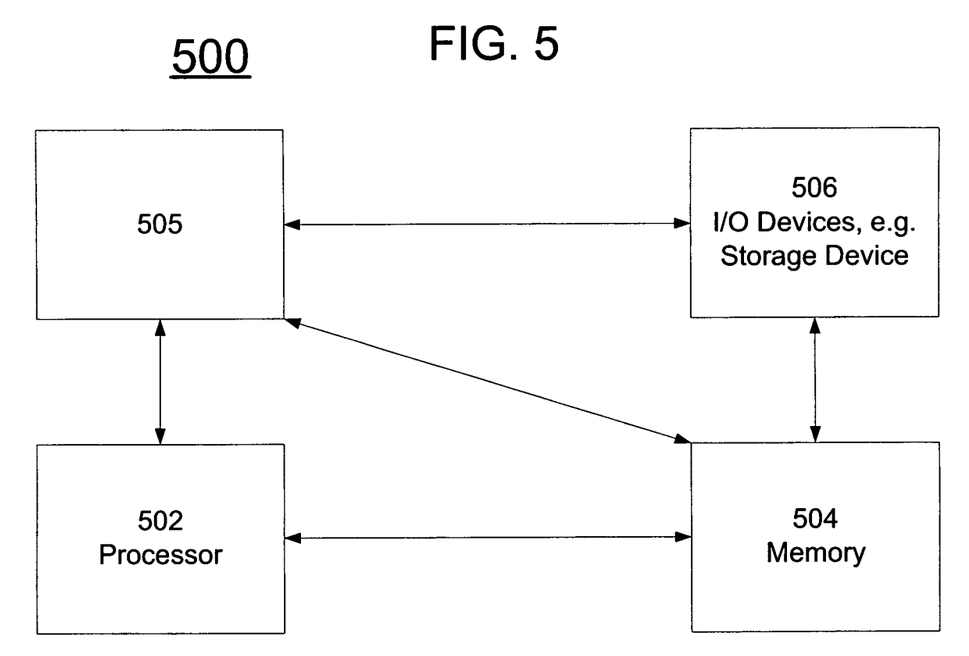
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a web session with a commercial advertiser on a video display device, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a web session with a commercial advertiser on a video display device can be loaded into memory 504 and executed by processor 502 to implement the functions as discussed above. As such, the present process 505 for providing a web session with a commercial advertiser on a video display device (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a web session with an advertiser in a communication network, comprising:
    displaying, by a processor of a video display device, a hyperlink of the advertiser within an established video session being viewed by a subscriber, wherein the established video session comprises a first video content received from a broadcast server in the communication network;
    receiving, by the processor, a request from the subscriber for activating the web session via the hyperlink;
    establishing, by the processor, the web session via the hyperlink, wherein the web session enables web session communications between the subscriber and a web server associated with the advertiser, wherein the web session is further enabled by a session controller in the communication network via the web server;
    establishing, by the processor, a second video session offered by the advertiser to the subscriber, wherein the second video session is established in response to receiving the request, wherein the establishing comprises displaying a second video content via the second video session, wherein the second video session is enabled by the session controller and wherein the second video content is sent by a video on demand server; and
    continuing, by the processor, a display of the established video session continuously in a background in an independent display frame while engaging in the web session and while the second video content is displayed via the second video session for the subscriber.

2. The method of claim 1, wherein the communication network is a service over internet protocol network.

3. The method of claim 1, wherein the hyperlink is displayed along with the established video session in the independent display frame.

4. The method of claim 1, wherein the request is received in response to the subscriber clicking the hyperlink that is displayed using a pointer device.

5. A non-transitory computer-readable medium storing instructions which, when executed by a processor of a video display device, cause the processor to perform operations for providing a web session with an advertiser in a communication network, the operations comprising:
    displaying a hyperlink of the advertiser within an established video session being viewed by a subscriber, wherein the established video session comprises a first video content received from a broadcast server in the communication network;
    receiving a request from a subscriber for activating the web session via the hyperlink;
    establishing the web session via the hyperlink, wherein the web session enables web session communications between the subscriber and a web server associated with the advertiser, wherein the web session is further enabled by a session controller in the communication network via the web server;
    establishing a second video session offered by the advertiser to the subscriber, wherein the second video session is established in response to the receiving the request, wherein the establishing comprises displaying a second video content via the second video session, wherein the second video session is enabled by the session controller and wherein the second video content is sent by a video on demand server; and
    continuing a display of the established video session continuously in a background in an independent display frame while engaging in the web session and while the second video content is displayed via the second video session for the subscriber.

6. The non-transitory computer-readable medium of claim 5, wherein the communication network is a service over internet protocol network.

7. The non-transitory computer-readable medium of claim 5, wherein the hyperlink is displayed along with the established video session in the independent display frame.

8. The non-transitory computer-readable medium of claim 5, wherein the request is received in response to the subscriber clicking the hyperlink that is displayed using a pointer device.

9. A system for providing a web session with an advertiser in a communication network, comprising:
    a broadcast server for displaying a hyperlink of the advertiser within an established video session being viewed by a subscriber via a video display device;
    a session controller for receiving a request from the subscriber for activating the web session via the hyperlink, wherein the web session enables web session communications between the subscriber and a web server associated with the advertiser, wherein the web session is further enabled by the session controller via the web server;

the web server, wherein the web server is for establishing the web session and for establishing a second video session offered by the advertiser to the subscriber, wherein the web server establishes the second video session in response to the session controller receiving the request from the subscriber; and a video on demand server for sending a second video content via the second video session for display on the video display device;

wherein the system continues a display of the established video session continuously in a background in an independent display frame while engaging in the web session and while the second video content is displayed via the second video session for the subscriber.

* * * * *